United States Patent Office

3,204,015
Patented Aug. 31, 1965

3,204,015
SPHERICAL PARTICLES
Paulus H. de Ruyter, Breda, and Jean T. B. Winia, Velp, Netherlands, assignors to Algemene Kunstzijde Unie N.V., Arnhem, Netherlands, a corporation of the Netherlands
No Drawing. Filed Nov. 9, 1964, Ser. No. 409,943
Claims priority, application Netherlands, Feb. 23, 1962, 275,218
2 Claims. (Cl. 264—11)

This invention relates to an improved process for the manufacture of spherical particles of a hydrogel of carboxymethylcellulose (CMC), which gel contains not more than 2% by weight of CMC, by adding to an aluminum ion-containing hardening bath a hydrosol of CMC in the form of drops, in which bath the hydrosol is converted into a hydrogel.

The present application is a continuation-in-part of our earlier copending application Serial No. 258,124, filed February 13, 1963, now abandoned.

A process of the type mentioned above is known broadly from the British Patent No. 807,015 (see Example 2), according to which a 1% by weight CMC solution is added in the form of drops to a 2% by weight solution of alum. On coming into contact with the alum solution, the drops of the CMC solution instantly harden to form spherical particles of a hydrogel, which particles are hereinafter referred to as pellets. These pellets, which may have a diameter of, for instance, 1–10 mm., may be mixed with a hardenable liquid mass such as concrete mortar, gypsum, rubber latex, and the like. After the mixture thus obtained has hardened and the water present in the pellets has evaporated, a solid and porous material is obtained.

For various reasons the pellets obtained by the above-mentioned known process are not very suitable for use as a preforming medium in the manufacture of porous material.

For example, it has been found that pellets produced in such manner are hardened only on the outside, while they remain liquid inside. As a result, they are crushed on mixing them with, for instance, concrete mortar. Another disadvantage associated with the use of pellets produced by this known process is that the outer layer of the pellets contains a high percentage of aluminum salt, which may influence the quality of the hardenable material unfavorably.

In accordance with the present invention, it has been found that these and other drawbacks may be obviated by carrying out the process indicated above as broadly known in such a manner that instead use is made of a hardening bath containing from 0.06 to 0.35 gram of aluminum ions per liter.

When in carrying out the process according to the present invention the drops of the CMC solution come into contact with the hardening bath, pellets are immediately formed which are completely hardened after a relatively short time and which may be employed as such in the manufacture of porous materials. The concentration of salts in these pellets is so low that it causes no difficulties in the manufacture of porous materials. If desirable for certain applications, however, this already low concentration may be reduced still further in a simple manner such as by washing.

In the process according to the present invention, the amounts of aluminum salts used are smaller than in the previously known process, which therefore represents a great economic advantage.

The aluminum ions present in the hardening bath may be derived from any suitable water-soluble aluminum salt. Examples of suitable salts that may be used are aluminum halides such as the chloride and bromide, aluminum nitrate, aluminum sulphate, ammonium aluminum chloride, and the like. Very good results are obtained using double sulphates of aluminum, and particularly potassium aluminum alum.

The amounts of aluminum in the hardening bath may vary between the limits indicated. As already mentioned, at relatively high concentrations difficulties are encountered owing to incomplete hardening of the pellets. At concentrations lower than 0.06 gram of aluminum ions per liter the drops of the CMC solution harden too slowly so that no pellets are formed, but rather a thready mass is obtained which is unsuitable for the manufacture of porous articles.

It has been found that the most favorable results are obtained using a hardening bath containing about 0.15 gram of aluminum ions per liter, since in that case pellets having optimum properties are obtained in a short time.

It is preferred that after the pellets are prepared according to the present invention, they are subjected to washing to reduce the aluminum content still further.

The hydrosols of CMC which may be employed in the process according to the present invention are aqueous solutions of water-soluble salts of CMC, such as the alkali metal salts exemplified by sodium carboxymethylcellulose, which solutions are of course known per se.

Although CMC types having widely varying chain lengths may be employed, the best results are obtained when using high-molecular weight CMC types—which are also referred to as high-viscous CMC—because they can be used to prepare high-viscous aqueous solutions having a relatively low CMC content. Preferably, use is made of CMC types having an average molecular weight higher than 200,000.

The CMC employed in the practice of the invention may have any degree of substitution. The degree of substitution indicates the average number of carboxymethyl groups present in a glucocidic ring. The degree of substitution must not be so low that the CMC no longer dissolves in water. In actual practice the best results are obtained using CMC types having a degree of substitution ranging from 0.4 to 1.0.

Suitable CMC types to be used in the process according to the present invention are also those in which the molecules have been cross-linked by reacting them with a polyfunctional compound, suitable examples of which are epichlorhydrin, succinaldehyde, dimethylglyoxal and glyoxal.

Although it is preferred to start from pure CMC, this is not strictly necessary. The CMC may contain certain impurities such as sodium chloride, sodium glycolate, and sodium acetate, which are formed in the CMC production process.

It is also possible to start from a mixture of various CMC types or from CMC mixed with small amounts of other gelforming substances, such as gelatine, starch and starch ethers, agar-agar, methylcellulose, alginates, and the like.

The preferred concentration of CMC solution is dependent on the final properties required for the pellets. If very strong pellets are required, then a higher concentration will be chosen than when relatively weak pellets of the same size are desired. In general, excellent results are obtained starting from a 1% aqueous CMC solution, which may be prepared, for instance, by dissolving slightly more than 10 grams of sodium-CMC in 1 liter of water.

The CMC solution may be subdivided into drops in various ways. Thus, use may be made of well known apparatus for the formation of spherical particles starting from liquids. For instance, the solution may be fed in the form of drops emerging from narrow openings, and passing, for instance, through an intervening air zone, to the hardening bath. In this way the drops will all be of about the same size. Although good results are obtained by this method, it has the disadvantage that it cannot be used for large-scale production. For this reason, it is generally preferred that the drops be formed with the aid of centrifugal force. Thus, the CMC solution may be caused to flow on to a rotating disc, from which the solution flies off in the form of drops. Even better results are obtained using an apparatus such as described in German Patent No. 624,279, in which the solution is passed into a vertical rotating cylindrical vessel, the wall of which is provided with openings. Preferably, rotary motion is also imparted to the hardening bath, as a result of which the surface thereof takes on a parabolical shape in the center of which there is the rotating vessel. The use of such an eddying hardening bath is broadly known from the German Patent No. 551,663.

The present invention includes, in addition to the above-described process, the pellets manufactured by this process.

The present invention also includes a process for the manufacture of porous material by hardening a mixture of a liquid material, such as prepared gypsum, with pellets, use being made of pellets manufactured by the process of the present invention. Articles consisting entirely or partly of porous material manufactured in this manner are also regarded as being within the scope of the present invention.

The invention will be further elucidated with the aid of the following examples which are merely illustrative of the general principles involved herein.

*Example I*

1.0 kg. of a CMC product (consisting of 91% by weight of sodium carboxymethylcellulose having an average degree of substitution of 0.6 and an average molecular weight of about 250,000 and containing as impurities 1.7% of sodium chloride, 1.3% of sodium glycolate and sodium acetate, and 6% of water) is slowly added to 91 liters of water which is stirred vigorously. In this way a homogeneous solution is obtained. This solution is added, in the form of drops, to an aqueous solution of potassium aluminum sulphate containing 0.15 gram of aluminum ions per liter, while the latter solution is flowing through a trough.

In this flowing solution the drops solidify to form pellets having an average diameter of about 3 mm. The pellets are continuously entrained by the flowing liquid and thereby fed to a vessel in which they remain for about 60 minutes. Next, they are passed into an inclined rotating cylindrical screen where the alum solution is discharged, after which the pellets are washed with water as they pass over the screen.

After the pellets have left the screen, they may be incorporated in a hardenable liquid mass.

*Example II*

An aqueous 1% CMC solution is divided into drops having a diameter of about 2 mm. with the aid of a per se known apparatus using centrifugal force. The drops fly into a hardening bath containing such an amount of aluminum sulphate that the aluminum ions concentration is about 0.25 gram per liter. The drops instantly harden in this bath. They are filtered off and left in contact with the adhering bath liquid for 60 minutes.

The pellets thus obtained are thereafter washed with water and are then suitable for use as a pore-forming medium in the manufacture of porous materials of the type indicated above.

*Example III*

Following the method described in Example I a homogeneous aqueous solution of sodium carboxymethylcellulose is added dropwise to two different aqueous solutions of potassium aluminum sulphate containing 0.35 and 0.40 gram of aluminum ions per liter respectively.

In the first case the washed pellets finally obtained are completely hardened and of a quality similar to those obtained in Example I.

In the latter case the pellets appear to be at least partly liquid inside and are thus unsuitable for use as a pore-forming medium in the manufacture of porous materials.

It is apparent that many modifications may be made by one skilled in the art upon reading the foregoing description without departing from the true spirit of the invention, and hence all such modifications are deemed to fall within the scope of the following claims.

What is claimed is:

1. In a process for the manufacture of spherical particles of a hydrogel of carboxymethylcellulose, which gel contains up to about 2% by weight of carboxymethylcellulose by adding to an aluminum ions-containing hardening bath a hydrosol, consisting essentially of an aqueous solution of a water-soluble alkali metal salt of carboxymethylcellulose having an average molecular weight greater than 200,000 and a degree of substitution in the range 0.4 to 1.0, in the form of drops, in which bath the hydrosol is converted into a hydrogel, and thereafter recovering the spherical hydrogel particles, the improvement comprising employing a hardening bath consisting essentially of an aqueous solution of a water-soluble aluminum salt in a concentration of 0.06 to 0.35 gram of aluminum ions per liter.

2. A process as defined in claim 1, wherein the hardening bath consists essentially of an aqueous solution of a water-soluble aluminum salt in a concentration of about 0.15 gram of aluminum ions per liter.

No references cited.

ROBERT F. WHITE, *Primary Examiner.*